US007874909B2

(12) United States Patent
Pryzby et al.

(10) Patent No.: US 7,874,909 B2
(45) Date of Patent: Jan. 25, 2011

(54) WAGERING GAME HAVING ANIMATION FOR SPECIAL SYMBOLS

(75) Inventors: Eric M. Pryzby, Skokie, IL (US); Michael P. Connelly, Elmwood Park, IL (US)

(73) Assignee: WMS Gaming Inc., Waukegan, IL (US)

( * ) Notice: Subject to any disclaimer, the term of this patent is extended or adjusted under 35 U.S.C. 154(b) by 1835 days.

(21) Appl. No.: 10/860,831

(22) Filed: Jun. 4, 2004

(65) Prior Publication Data

US 2005/0282613 A1 Dec. 22, 2005

(51) Int. Cl.
*A63F 13/00* (2006.01)

(52) U.S. Cl. .......................... 463/20; 463/16; 463/25; 463/31

(58) Field of Classification Search .................. 463/16, 463/20, 25, 31, 40–43; 273/138.1, 139
See application file for complete search history.

(56) References Cited

U.S. PATENT DOCUMENTS

| | | | | |
|---|---|---|---|---|
| 3,357,703 | A | 12/1967 | Hurley | 273/138 |
| 4,506,890 | A | 3/1985 | Murry | 273/138 A |
| 4,909,513 | A | 3/1990 | Kiyono | 273/145 R |
| 5,031,914 | A | 7/1991 | Rosenthal | 273/146 |
| 5,259,616 | A | 11/1993 | Bergman | 273/138 A |
| 5,393,057 | A | 2/1995 | Marnell, II | 273/85 CP |
| 5,393,061 | A | 2/1995 | Manship et al. | 273/143 R |
| 5,580,053 | A | 12/1996 | Crouch | 463/20 |
| 5,697,843 | A | 12/1997 | Manship et al. | 463/20 |
| 5,779,549 | A | 7/1998 | Walker et al. | 463/42 |
| 6,004,208 | A | 12/1999 | Takemoto et al. | 463/20 |
| 6,056,642 | A | 5/2000 | Bennett | 463/20 |
| 6,086,066 | A | 7/2000 | Takeuchi et al. | 273/143 R |
| 6,089,977 | A | 7/2000 | Bennett | 463/20 |
| 6,089,978 | A | 7/2000 | Adams | 463/20 |
| 6,093,102 | A | 7/2000 | Bennett | 463/20 |
| 6,251,013 | B1 | 6/2001 | Bennett | 463/13 |
| 6,270,411 | B1 | 8/2001 | Gura et al. | 463/20 |
| 6,290,600 | B1 * | 9/2001 | Glasson | 463/20 |
| 6,311,976 | B1 * | 11/2001 | Yoseloff et al. | 273/138.2 |
| 6,517,432 | B1 | 2/2003 | Jaffe | 463/16 |
| 6,729,955 | B2 | 5/2004 | Bennett et al. | 463/20 |
| 6,793,578 | B2 * | 9/2004 | Luccesi et al. | 463/20 |
| 2002/0052235 | A1 | 5/2002 | Hirsch et al. | 463/31 |
| 2003/0060259 | A1 * | 3/2003 | Mierau et al. | 463/16 |

(Continued)

FOREIGN PATENT DOCUMENTS

| | | |
|---|---|---|
| DE | 27 26 145 | 12/1978 |

(Continued)

OTHER PUBLICATIONS

Product Sheet, "Great Whites," Anchor Gaming 2000 (but believed to be available about 1998).

(Continued)

*Primary Examiner*—Peter DungBa Vo
*Assistant Examiner*—Masud Ahmed
(74) *Attorney, Agent, or Firm*—Nixon Peabody LLP

(57) ABSTRACT

A method of conducting a video wagering game includes displaying a portion of a symbol array on a display. The symbol array includes an advantageous symbol that is animated before a remaining portion of the symbol array is displayed.

85 Claims, 9 Drawing Sheets

U.S. PATENT DOCUMENTS

| | | | | |
|---|---|---|---|---|
| 2003/0064782 | A1 | 4/2003 | Beaulieu et al. | 463/20 |
| 2003/0069062 | A1 * | 4/2003 | Shimizu | 463/20 |
| 2003/0125102 | A1 * | 7/2003 | Cannon | 463/20 |
| 2004/0072614 | A1 | 4/2004 | Roukis | 463/25 |
| 2004/0127281 | A1 * | 7/2004 | Fong et al. | 463/20 |
| 2005/0143164 | A1 * | 6/2005 | Duhamel et al. | 463/20 |
| 2005/0266916 | A1 | 12/2005 | Sato et al. | 463/20 |
| 2005/0282613 | A1 | 12/2005 | Pryzby et al. | 463/20 |

FOREIGN PATENT DOCUMENTS

| | | | |
|---|---|---|---|
| GB | 2 106 685 | | 4/1983 |
| GB | 2 262 642 | | 6/1993 |
| GB | 2316214 | * | 2/1998 |
| WO | WO 99/10849 | | 3/1999 |
| WO | WO 99/64977 | | 12/1999 |
| WO | WO 00/32286 | | 6/2000 |

OTHER PUBLICATIONS

Advertisement; "Penguin Pays," Aristocrat Incorporated, 1998.

Article, "Wild Cougar," Aristocrat Leisure Industries; *Strictly Slots*, Feb. 1999, pp. 44.

Brochure; "Wild Cougar," Feb. 1994, 2 pages.

Article; "The Full Monty, Shuffle Master, Bally Gaming and Monty Hall Bring *Let's Make a Deal* to the slot floor," *Strictly Slots*, Jun. 1999, pp. 48-51.

Office Action, U.S. Appl. No. 11/399,268, mail date Jan. 18, 2008, 12 pages.

* cited by examiner

WAGERING GAME HAVING ANIMATION FOR SPECIAL SYMBOLS

FIELD OF THE INVENTION

The present invention relates generally to gaming terminals for playing a wagering game and, more particularly, to a gaming terminal displaying an animation of an advantageous symbol, which is included in a symbol array, before fully displaying the symbol array.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by increasing the entertainment value and excitement associated with the game.

One concept that has been successfully employed to enhance the entertainment value of a game is that of a "secondary" or "bonus" game which may be played in conjunction with a "basic" game. The bonus game, which is entered upon the occurrence of a selected event such as a start-bonus outcome of the basic game, may comprise any type of game, either similar to or completely different from the basic game. Such a bonus game produces a significantly higher level of player excitement than the basic game because it provides a greater expectation of winning than the basic game.

One problem with current games is that they do not provide a player with visual anticipation during a start-bonus outcome of the basic game. Thus, in current games the player's visual sense is not fully enhanced during the period between the basic game and the bonus game. Instead of providing a climatic experience for the player, steadily building the player's expectation of reaching the bonus game, current games generally provide an almost immediate result informing the player that a bonus game has been won. These games, which show an almost immediate result of a bonus game, fail to capitalize on the player's visual sense of anticipation and, consequently, fail to provide a more entertaining gaming experience.

In one type of games, sounds are used for creating anticipation in a player. For example, in one type of games the gaming machine makes a sound as each trigger symbol lands in the display area. The sound indicates to the player that a bonus game is getting closer. In another type of games, all the trigger symbols are animated for entertainment purposes, to increase the player's gaming experience, after all the reels have stopped. None of these two types of games succeed in enhancing the player's gaming anticipation such that the player can visually observe, with anticipation, how close a particular spin has come to a bonus game.

Therefore, a need exists for a gaming machine that will provide a solution to the problems discussed above.

SUMMARY OF THE INVENTION

A gaming terminal for playing a basic wagering game and a bonus game includes a display and a plurality of reels being shown on the display. The display shows at least one outcome for the basic wagering game, wherein the outcome is selected from a plurality of outcomes in response to receiving a wager input from a player. The plurality of reels include an arrangement of symbols for portraying the selected outcome to the player. The arrangement of symbols includes at least one advantageous symbol having a number of graphic modes. The display presents to the player an animation based on at least two of the graphic modes of the advantageous symbol in response to the advantageous symbol landing on a payline before all of the plurality of reels have stopped.

In another aspect of the present invention, a method of conducting a basic wagering game and a bonus game on a gaming terminal includes accepting a wager input for the basic wagering game. At least one outcome is selected from a plurality of outcomes for the basic wagering game and is displayed in response to the wager input. A plurality of moving reels indicate the randomly-selected outcome with symbols aligned along a payline. A reel of the plurality of reels is stopped with an advantageous symbol landing along the payline. A graphical animation is created between at least two graphic modes of the advantageous symbol before all of the plurality of reels have stopped to increase a player's anticipation for a winning outcome. The animation increases a player's anticipation for a winning outcome. The remaining ones of the plurality of reels are stopped to indicate the selected outcome.

In an alternative aspect of the present invention, a method of conducting a wagering game on a gaming terminal includes accepting a wager input for the wagering game. At least one outcome is selected from a plurality of outcomes of the wagering game and is displayed in response to the wager input. A reel of a plurality of spinning reels is stopped to display along an active payline an advantageous symbol. The advantageous symbol includes a first graphic mode and a second graphic mode. An animation between the first graphic mode and the second graphic mode is displayed to indicate visually to a player how close the wagering game is to reaching a winning outcome. The animation helps to increase the level of excitement and anticipation in the player of the wagering game. The remaining ones of the plurality of reels are stopped to indicate the randomly-selected outcome. An award is provided according to a pay table if the selected outcome is a winning outcome.

In an alternative aspect of the present invention, a method of conducting a wagering game includes randomly selecting at least one outcome from a plurality of outcomes in response to receiving a wager from a player. The method includes presenting on the display the at least one outcome to the player in the form of an arrangement of symbols, at least one of said symbols being an advantageous symbol. The method further includes causing at least two graphic modes of the at least one advantageous symbol to be displayed on the display before the arrangement is presented to the player.

In an alternative aspect of the present invention, a gaming terminal for playing a wagering game includes a display and a controller coupled to the display. The controller is programmed to present on the display at least one outcome of a plurality of outcomes. The at least one outcome is displayed to a player in the form of an arrangement of symbols, at least one of the symbols being an advantageous symbol. The controller is further programmed to cause at least two graphic modes of the advantageous symbol to be displayed on the display on a reel before the symbol arrangement is fully presented to the player.

In an alternative aspect of the present invention, a method of conducting a video wagering game includes rotating a plurality of symbol-bearing reels and stopping one of the symbol-bearing reels with an advantageous symbol on the stopped reel displayed to a player. The method further includes animating the advantageous symbol before all of the symbol-bearing reels have stopped.

In an alternative aspect of the present invention, a method of conducting a video wagering game includes displaying on a display a portion of a symbol array. The symbol array includes an advantageous symbol that is animated before a remaining portion of the symbol array is displayed.

The above summary of the present invention is not intended to represent each embodiment, or every aspect, of the present invention. Additional features and benefits of the present invention are apparent from the detailed description, figures, and claims set forth below.

Figure 1:
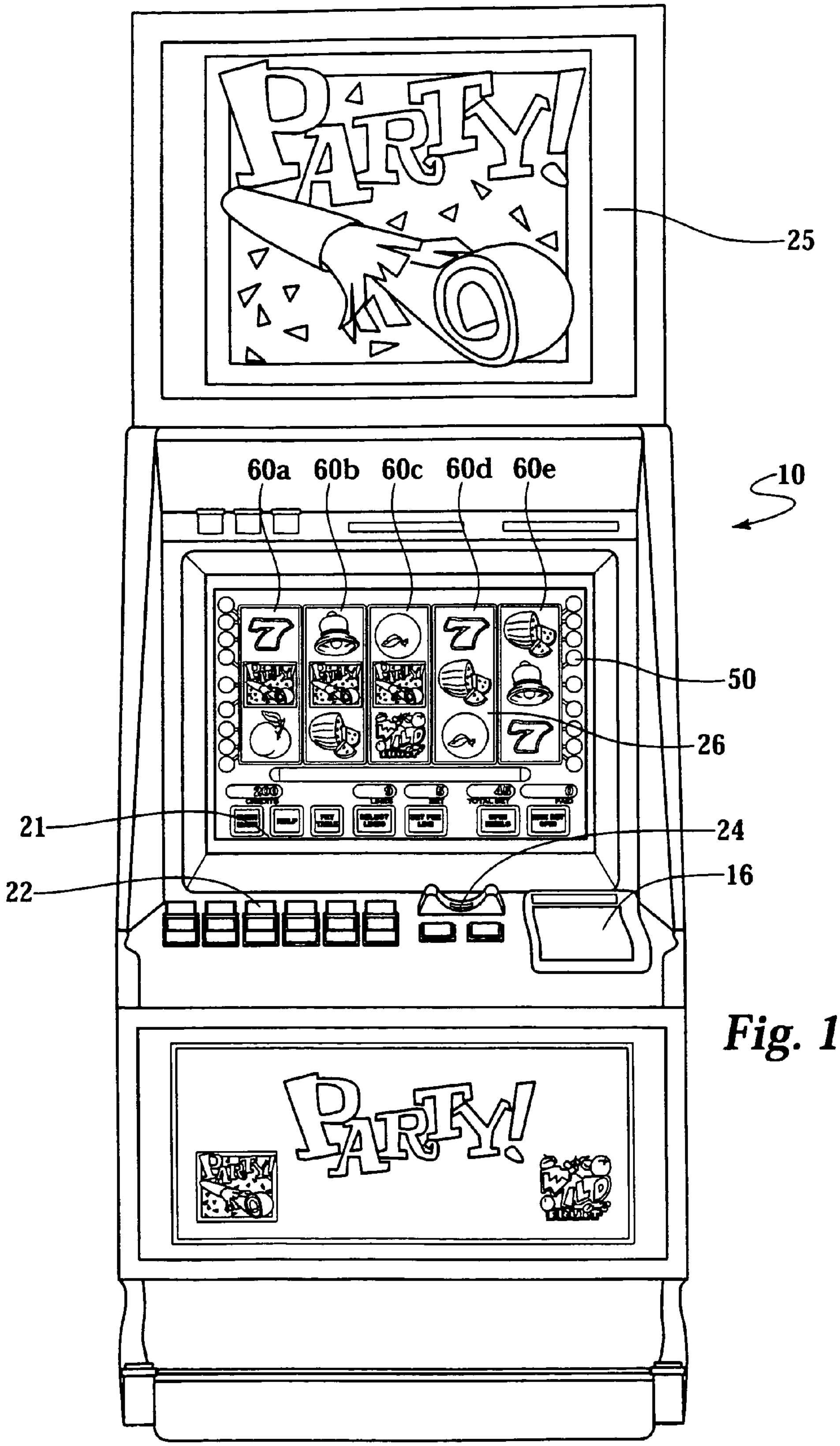
FIG. 1 illustrates a gaming terminal that is useful for displaying a start-bonus outcome in accordance with the present invention.

While the invention is susceptible to various modifications and alternative forms, specific embodiments are shown by way of example in the drawings and are described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Referring to FIG. 1, a gaming terminal 10 is used in gaming establishments such as casinos. With regard to the present invention, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play a video casino game, such as blackjack, slots, keno, poker, etc.

The gaming terminal 10 includes input devices, such as a wager acceptor 16, a touch screen 21, a push-button panel 22, and a player-identification card reader 24. For output the gaming terminal 10 includes a main display 26 for displaying information about the basic wagering game. The main display 26 can also display information about a bonus wagering game and a progressive wagering game. The gaming terminal 10 also includes a secondary game display 25 for displaying the bonus wagering game, or for displaying award amounts of a progressive game. While these typical components found in the gaming terminal 10 are described below, it should be understood that numerous other elements may exist and may be used in any number of combinations to create various forms of a gaming terminal.

The wager acceptor 16 may be provided in many forms, individually or in combination. The wager acceptor 16 may include a coin slot acceptor or a note acceptor to input value to the gaming terminal 10. Or, the wager acceptor 16 may include a card-reading device for reading a card that has a recorded monetary value with which it is associated. The card may also authorize access to a central account, which can transfer money to the gaming terminal 10.

The push button panel 22 is typically offered, in addition to the touch screen 21, to provide players with an option on how to make their game selections. Alternatively, the push button panel 22 provides inputs for one aspect of operating the game, while the touch screen 21 allows for inputs needed for another aspect of operating the game.

The operation of the basic wagering game is displayed to the player on the main display 26. The main display 26 can also display the bonus game associated with the basic wagering game. The main display 26 may take the form of a cathode ray tube (CRT), a high resolution LCD, a plasma display, a LED, or any other type of video display suitable for use in the gaming terminal 10. As shown, the main display 26 includes the touch screen 21 overlaying the entire monitor (or a portion thereof) to allow players to make game-related selections. Alternatively, the gaming terminal 10 may have a number of mechanical reels to display the game outcome.

The player-identification card reader 24 allows for the identification of a player by reading a card with information indicating his or her true identity. Currently, the identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 24, which allows the casino's computers to register that player's wagering at the gaming terminal 10.

A player begins play of the basic wagering game by inserting a wager input into the wager input accepter 16 of the gaming terminal 10. A player can select play by either using the touch screen 21 or the push-button panel 22. The basic game consists of a plurality of symbols on reels 60*a*-60*e* (commonly referenced as reels 60) that are displayed along a plurality of paylines 50, yielding a plurality of outcomes of the basic game. Such outcomes are randomly selected in response to the wagering input by the player. One of the plurality of randomly-selected outcomes is a start-bonus outcome, which can include any variations of symbols or symbol combinations triggering a bonus game.

Figure 2:
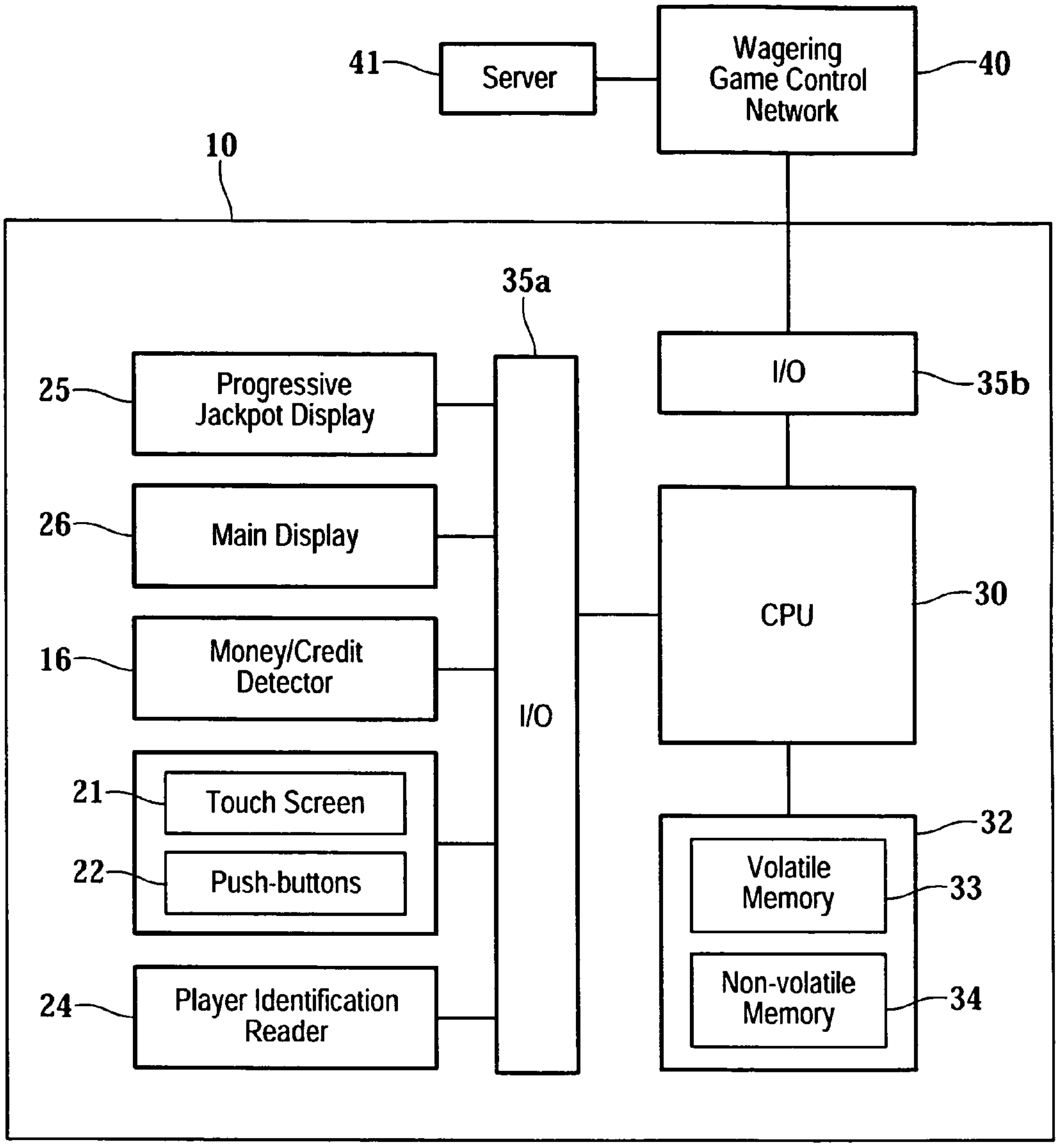
FIG. 2 illustrates a control system that is used in conjunction with the gaming terminal of FIG. 1.

As shown in FIG. 2, the various components of the gaming terminal 10 are controlled by a central processing unit (CPU) 30, also referred to as a processor (such as a microprocessor or microcontroller). To provide the gaming functions, the CPU 30 executes one or more game programs. The CPU 30 performs the random selection of an outcome from the plurality of outcomes of the wagering game. The CPU 30 is also coupled to or includes a system memory 32. The system memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*. Although the I/O circuits 35 may be shown as a single block, it should be appreciated that the I/O circuits 35 may include a number of different types of I/O circuits.

The gaming terminal 10 is typically operated as part of a game control network 40 having control circuitry and memory devices. The gaming terminal 10 often has multiple serial ports, each port dedicated to providing data to a specific host computer system that performs a specific function (e.g., accounting system, player-tracking system, progressive game control system, etc). To set up a typical serial communication hardware link to the host system, the typical RS-232 point-to-point communication protocol that is often present in the gaming terminal 10 is converted to an RS-485 (or RS-485-type) master-slave protocol so as to take advantage of some of the advantages of the RS-485 capability (e.g., multi-drop capability that allows many gaming terminals 10 to communicate with the game control network 40). To perform this function, a custom interface board may be used by the gaming terminal 10 for each communication port in the gaming terminal 10. It should be noted that the gaming terminal 10 can initially be designed to be configured for a typical RS-485 protocol, instead of the typical RS-232 protocol. Further, the gaming terminal 10 may simply be designed for an Ethernet connection to the game control network 40.

Figure 3:
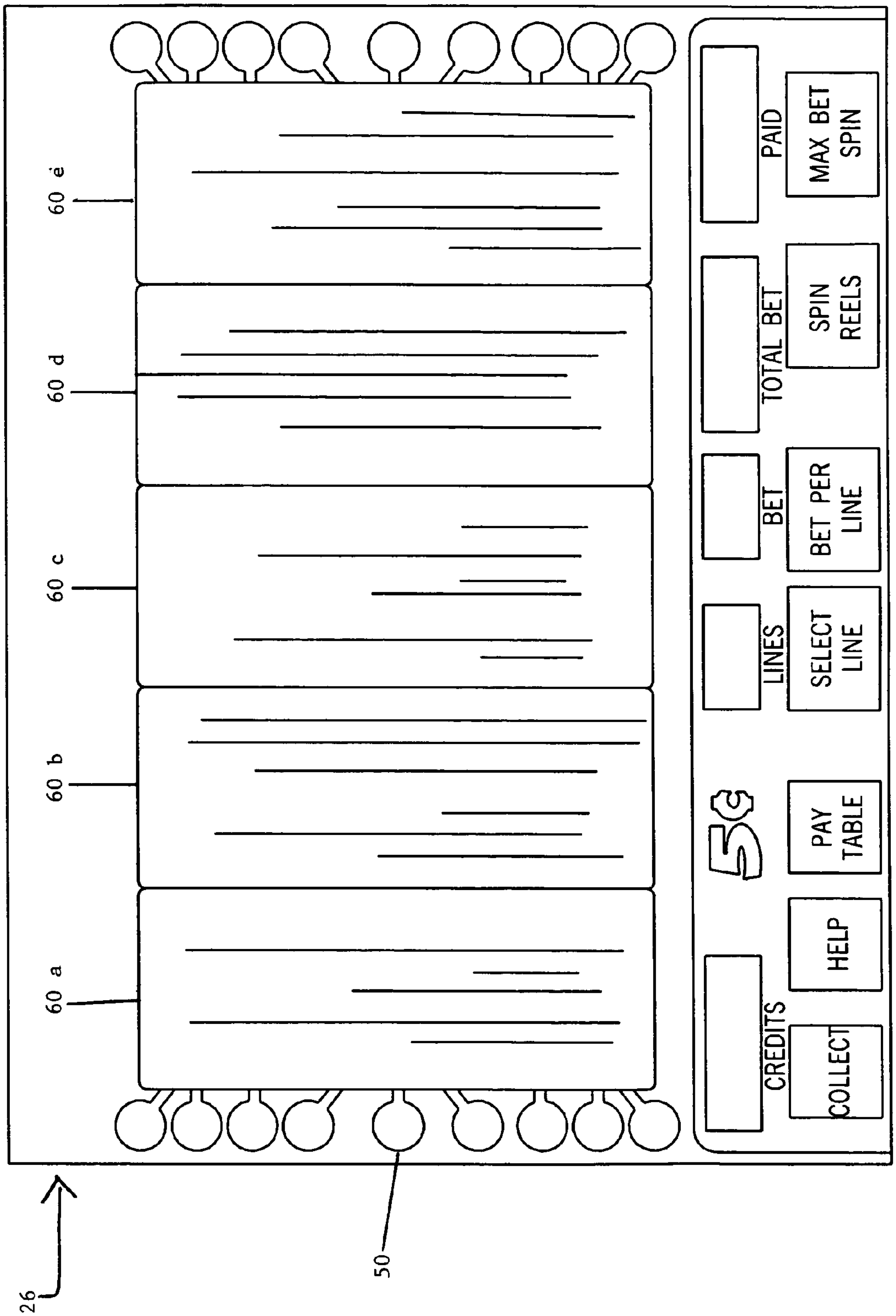
FIG. 3 illustrates a basic game screen showing a plurality of reels while they are spinning.

Referring now to FIG. 3, the main display 26 of the gaming terminal 10 shows the reels 60, which are spinning, and the plurality of paylines 50. Each time the player places a wager in a basic game and spins the reels 60, there is an inherent hope that one of the game outcomes is a start-bonus outcome. The player knows that a start-bonus outcome results in a bonus game which potentially can greatly increase the player's winnings. In fact, there is a perception in some players that just obtaining a start-bonus outcome is a success in itself, regardless of whether the actual bonus game provides the player with additional winnings. To build a player's anticipation, which generally translates in a more entertaining gaming experience, it is desirable to provide the player with visual hints that the start-bonus outcome is getting closer. Thus, a graphical interaction between at least two graphic modes of at least one advantageous, or special, symbol landing along any active payline 50 can visually show the player how close he or she is to obtaining a bonus game. The advantageous symbol is included in the plurality of symbols on the reels 60.

In general, reels 60 stop in sequence, one at a time, starting with the leftmost reel 60*a* and ending with the rightmost reel 60*e*. As each one of the reels 60 stops, the player can see the symbol on the reel that has landed on the active payline(s). In general, the presence of one or more advantageous symbols triggers a special event, such as the triggering of a bonus game or the winning of a progressive game. Regardless of how many advantageous symbols are required for triggering a bonus game, the player must wait until the predetermined number of advantageous symbols is selected to find out whether a bonus game has been triggered. To entertain the player during this waiting period, an animation of at least two graphic modes of an advantageous symbol is provided.

Figure 4:
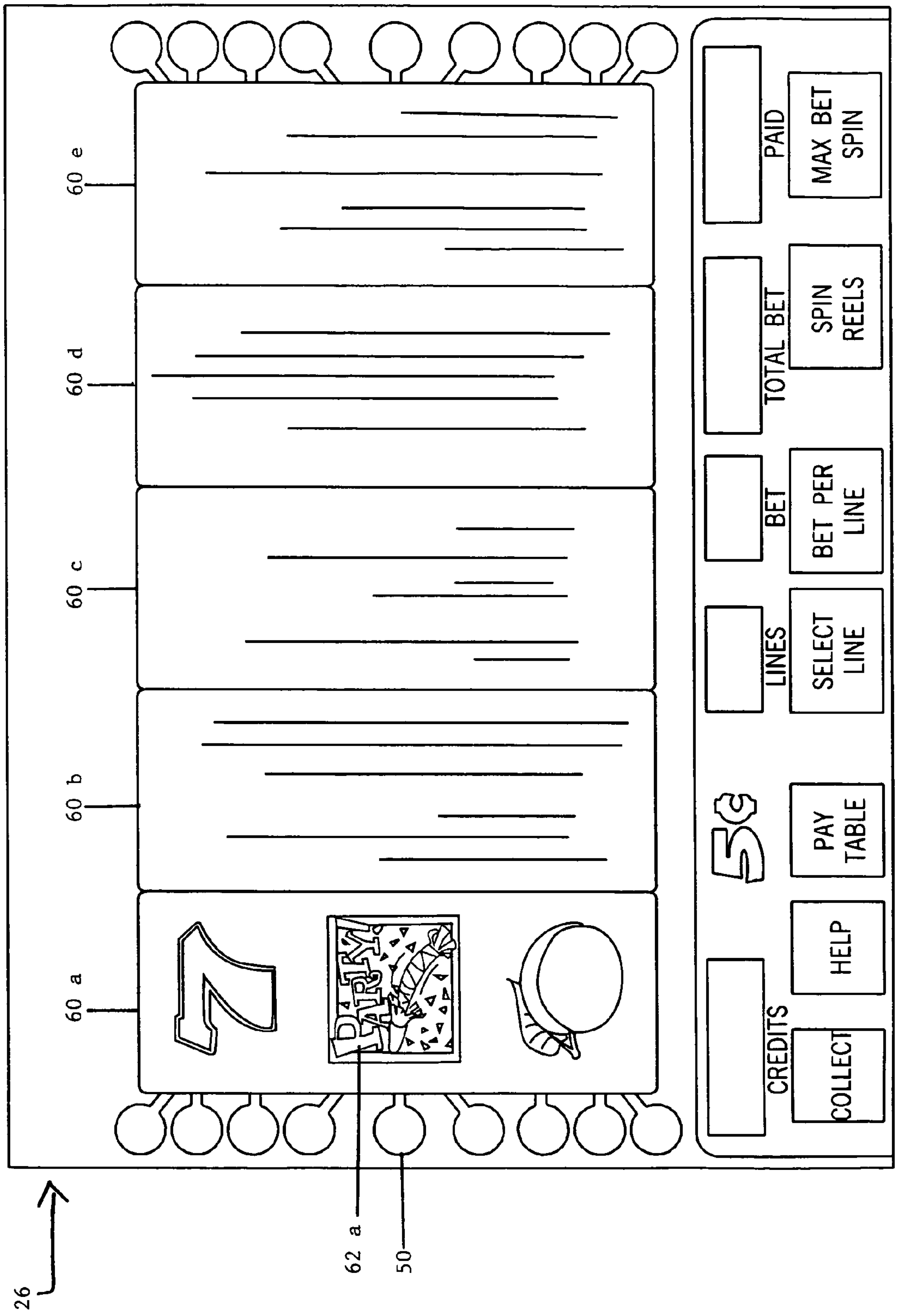
FIG. 4 illustrates the basic game screen of FIG. 3 showing one of the reels stopped.

An example of the present invention will be described below, in accordance with one embodiment of the present invention. Initially, the player plays the basic game and all the reels 60 are spinning, as shown in FIG. 3. For example purposes only, it is assumed that the only active payline 50 is a payline 50 extending across the central position of the reels. Referring to FIG. 4, the leftmost reel 60*a* has stopped and the remaining reels 60*b*-60*e* are still spinning. An advantageous symbol 62*a* has landed along the active payline 50. The advantageous symbol 62*a*, in this example, shows a party-blower within a square frame and has at least two graphic modes. The first graphic mode depicts the party-blower in a fully open, or blown, position, while the second graphic mode depicts the party-blower in a closed, or retracted, position. After the advantageous symbol 62*a* has landed on the payline 50, the CPU 30 is programmed to display sequentially the first and second graphic modes. Thus, an animation is created, or is perceived by the player, of the party-blower opening and closing. The animation of the first and second graphic modes can be displayed in any order. For example, the animation of the party-blower can show the party-blower opening and closing or closing and opening. Additionally, more than two graphic modes can be displayed.

Figure 5:
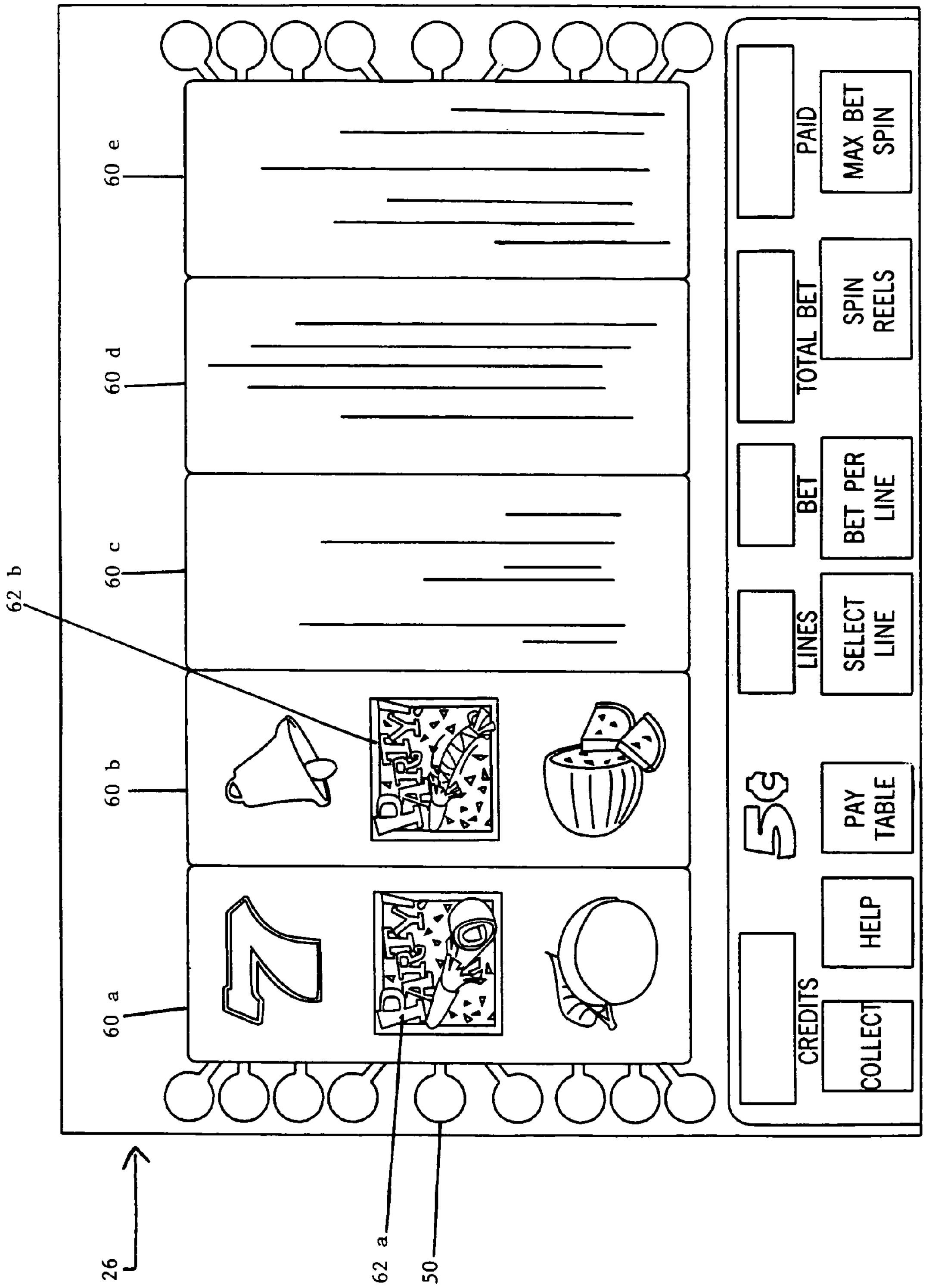
FIG. 5 illustrates the basic game screen of FIG. 3 showing two of the reels stopped.

Referring to FIG. 5, the adjacent reel 60*b* to the leftmost reel 60*a* has now stopped. An advantageous symbol 62*b* shown having the first graphic mode has landed along the active payline 50 in the adjacent reel 60*b*. The advantageous symbol 62*a* on the leftmost reel 60*a* is shown having the second graphic mode. The animation of the graphic modes of the advantageous symbol 62*a* can continue or to stop after the advantageous symbol 62*b* has landed in the reel 60*b*. Because the figures only show snapshots of the reels 60*a*-60*b*, before or after the reels 60*a*-60*b* have stopped, the figures do not show the full effect of the animation between the two graphic modes of each one of the advantageous symbols 62*a*-62*b*. Nevertheless, in real time a player observes, or perceives to observe, the party-blowers opening and closing to signal visually to the player that a winning outcome or special-event outcome is near. The winning outcome can be any type of well-known winning outcome, such as a bonus-award outcome, a progressive-award outcome, a top-award outcome, a credit-award outcome, etc.

Figure 6:
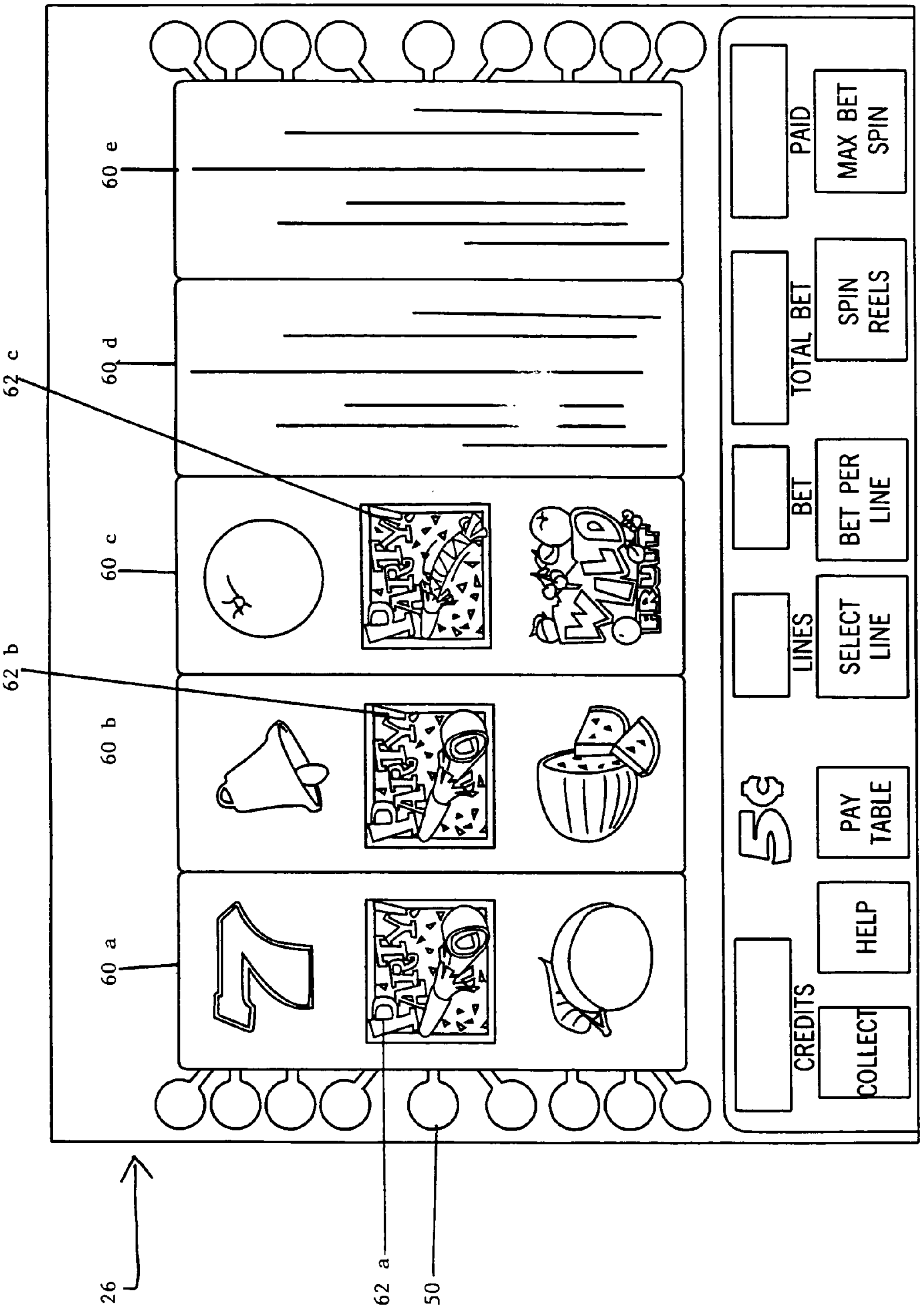
FIG. 6 illustrates the basic game screen of FIG. 3 showing three of the reels stopped.

In FIG. 6, the center reel 60*c* has now stopped and the advantageous symbol 62*c* has now landed on the center reel 60*c*. When the advantageous symbol 62*c* has stopped on the payline 50 of the center reel 60*c*, similar to the advantageous symbols 62a-62b, an animation is created between a first graphic mode and a second graphic mode of the advantageous symbol 62c. The animations of the advantageous symbols 62a-62b can be discontinued when the advantageous symbol 62c has landed on the center reel 60c, or can continue for a predetermined time limit.

In another embodiment of the present invention the animation can occur between graphic modes of two or more advantageous symbols. For example, an animation can occur, or is perceived by the player to occur, between at least one of the graphic modes of the advantageous symbol 62a and at least one of the graphic modes of the advantageous symbols 62b-62c.

There is at least one aspect of the graphical interaction between the first and second graphic modes 62a-62b, as described with reference to FIGS. 4-6, that helps to increase the player's excitement in playing the wagering game. Specifically, the aspect is related to the animation between the first and second graphic modes of at least one of the advantageous symbols 62a-62c, which gives the player an indication that a special event, such as a bonus game, might occur. Although the above description has referred to the advantageous symbols 62a-62c landing on adjacent reels, alternatively, the advantageous symbols 62a-62c may be animated when they are stopped on reels 60 that are not adjacent to each other, e.g., only the advantageous symbols 62a and 62c land on the leftmost reel 60a and the center reel 60c.

Figure 7:
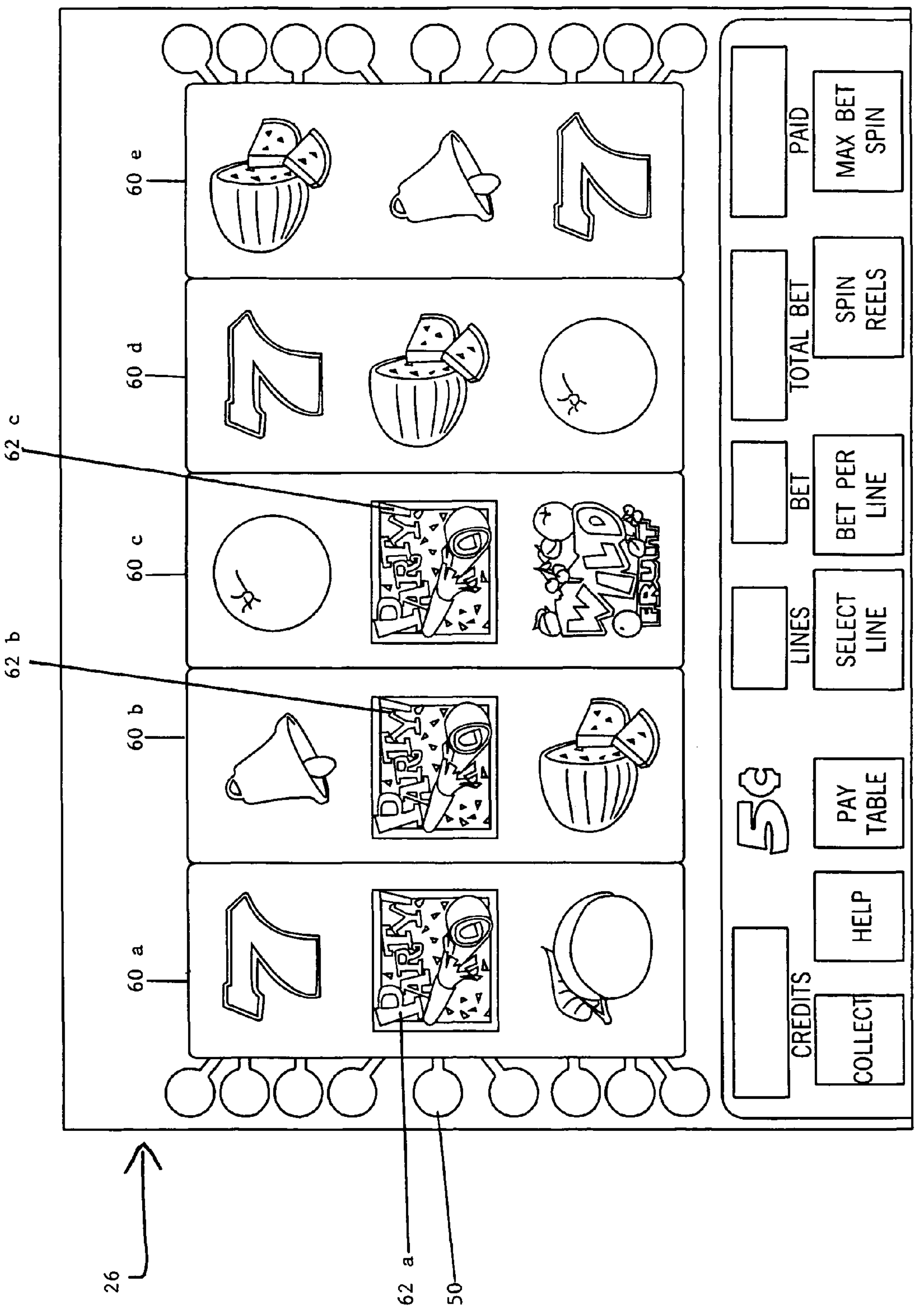
FIG. 7 illustrates the basic game screen of FIG. 3 showing all of the reels stopped.

Referring to FIG. 7, no advantageous symbols have been selected on the remaining reels 60d-60e and the reels have stopped. Thus, assuming that a bonus game would be triggered only if the advantageous symbol lands along the payline 50 in each one of the reels 60, the player has not achieved a bonus game. Nevertheless, the player has had a more entertaining and exciting gaming experience because the animation of the advantageous symbols 62a-62c has indicated how close the player was to the selection of a winning outcome or special-event outcome.

In another embodiment, the animation of one or more of the advantageous symbols 62a-62c changes the pace to heighten the anticipation of the player. For example, after having landed in the corresponding reel of reels 60 and along the active payline 50, the pace of the animation of the advantageous symbol 62c is faster than the pace of the animation of the advantageous symbol 62b, which, in turn, is faster than the pace of the animation of the advantageous symbol 62a. Thus, the player's sense of anticipation is visually stimulated by the sequential increase in the pace of the animations. Alternatively, the animation pace of all the advantageous symbols 62a-62c increases every time that another advantageous symbol lands along the payline 50. For example, after the advantageous symbol 62a has landed in the leftmost reel 60a, the advantageous symbol 62a is animated at a predetermined first pace. After the advantageous symbol 62b has landed in the adjacent reel 60b, the advantageous symbol 62b and the advantageous symbol 62a are animated at a second pace, which is faster or more accelerated than the first pace. Similarly, the pace of all three advantageous symbols 62a-62c is increased after the advantageous symbol 62c has landed in the center reel 60c.

Figure 8A:
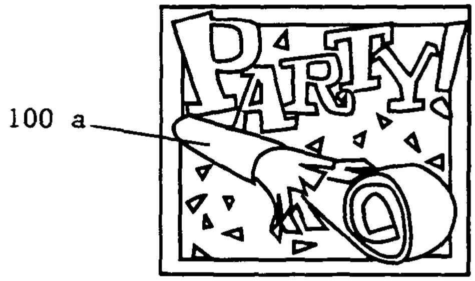
FIG. 8*a* illustrates a graphic of an advantageous symbol according to one embodiment of the present invention.
Figure 8B:
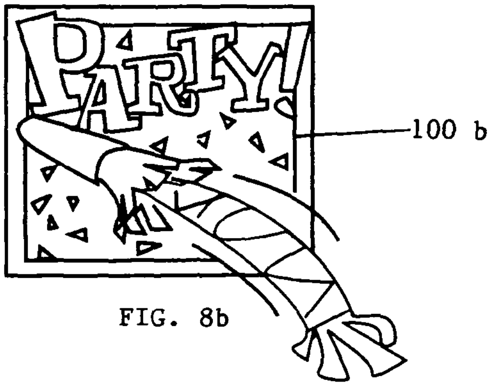
FIG. 8*b* illustrates another graphic of the advantageous symbol of FIG. 8*a*.

In FIGS. 8a-12b, different embodiments of the present invention will be described. In FIGS. 8a and 8b, a graphical interaction is created to illustrate a graphic that "steps off" the reel. A first graphic mode 100a of an advantageous symbol shows a fully-blown party-blower that has been opened beyond the margins of the graphic, and a second graphic mode 100b of the advantageous symbol shows the party-blower in a closed position. When the animation occurs between the two graphic modes 100a-100b the player sees, or perceives to see, a party-blower that is being opened and extends, or steps, beyond a symbol border.

In another alternative embodiment, the second graphic mode 100b is a continuation of the first graphic mode 100a, or vice versa. For example, the first graphic mode 100a displays a first part of an object and the second graphic mode 100b displays a second part of the same object. Thus, when the advantageous symbol lands on the corresponding ones of reels 60, the player sees the sequential assembly of the object, one part at a time. Alternatively, an object can be separated into a number equal to the number of reels, e.g., five parts for a five reel gaming terminal, so that a winning outcome is achieved if each one of the parts lands in each one of the reels 60. The number of parts can be a predetermined number or it can vary according to the number of reels available.

Figure 9A:
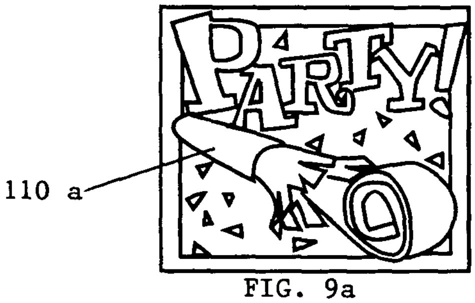
FIG. 9*a* illustrates a graphic of an advantageous symbol according to another embodiment of the present invention.
Figure 9B:
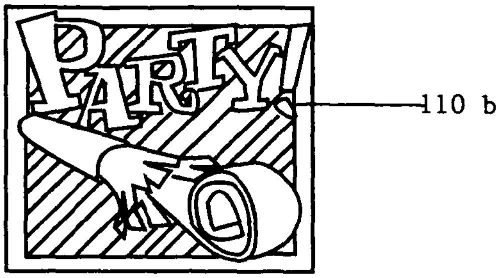
FIG. 9*b* illustrates another graphic of the advantageous symbol of FIG. 9*a*.

In FIGS. 9a and 9b, a graphical interaction is created to illustrate a graphic that has a changing background. A first graphic mode 110a of an advantageous symbol includes a graphic background that is different from the graphic background of a second graphic mode 110b of another advantageous symbol. The change in the backgrounds of the advantageous symbol helps to simulate the animation between the first and second graphic modes 110a-110b. In an alternate embodiment, the first graphic mode 110a of the advantageous symbol gives the perception that at least a part of the graphic "hovers" above the corresponding reel. For example, the first graphic mode 110a of the advantageous symbol can be depicted to have a three-dimensional texture by having the party-blower floating above the graphic's background. Optionally, at least a portion of the party-blower can be transparent or opaque such that at least a portion of the graphic's background is obscured by the party-blower and/or is less visible than the party-blower.

Figure 10A:
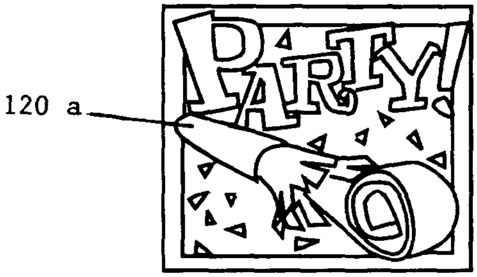
FIG. 10*a* illustrates a graphic of an advantageous symbol according to one embodiment of the present invention.
Figure 10B:
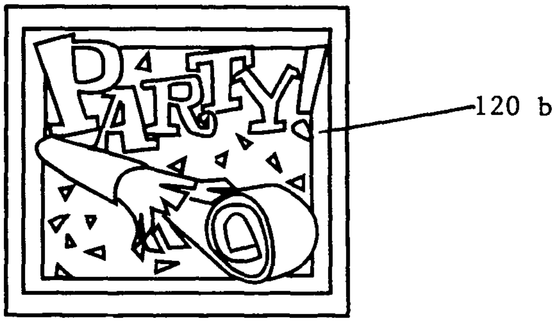
FIG. 10*b* illustrates another graphic of the advantageous symbol of FIG. 10*a*.

In FIGS. 10a and 10b a graphical interaction is created to illustrate a graphic mode that is highlighted by a border. An advantageous symbol includes a first graphic mode 120a showing a borderless graphic mode of a party-blower, and the advantageous symbol includes a border graphic mode 120b for highlighting the party-blower. Alternatively, the border can be illuminated.

Figure 11A:
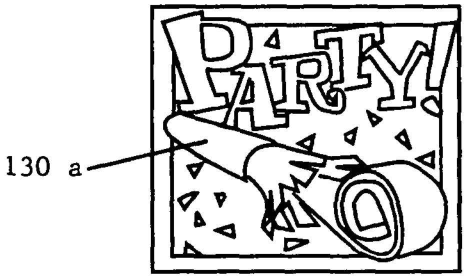
FIG. 11*a* illustrates a graphic of an advantageous symbol according to one embodiment of the present invention.
Figure 11B:
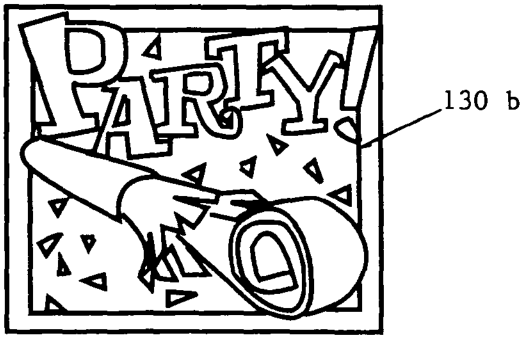
FIG. 11*b* illustrates another graphic of the advantageous symbol of FIG. 11*a*.

In FIGS. 11a and 11b a graphical interaction is created to illustrate a graphic that expands in size relative to a similar graphic. An advantageous symbol includes a party-blower first graphic mode 130a of an advantageous symbol that is smaller than a second graphic mode 130b. Alternatively, the party-blower first graphic mode 130a can be smaller than the party-blower second graphic mode 130b.

Figure 12B:
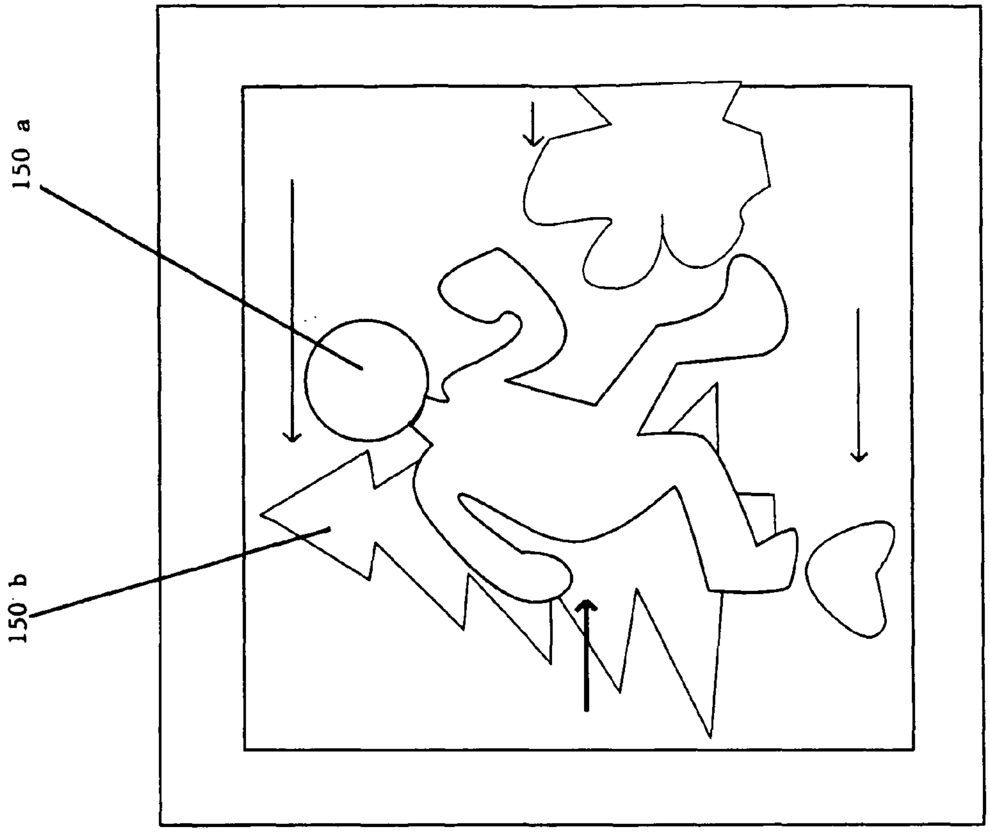
FIG. 12*b* illustrates another graphic of the advantageous symbol of FIG. 12*a*.
Figure 12A:
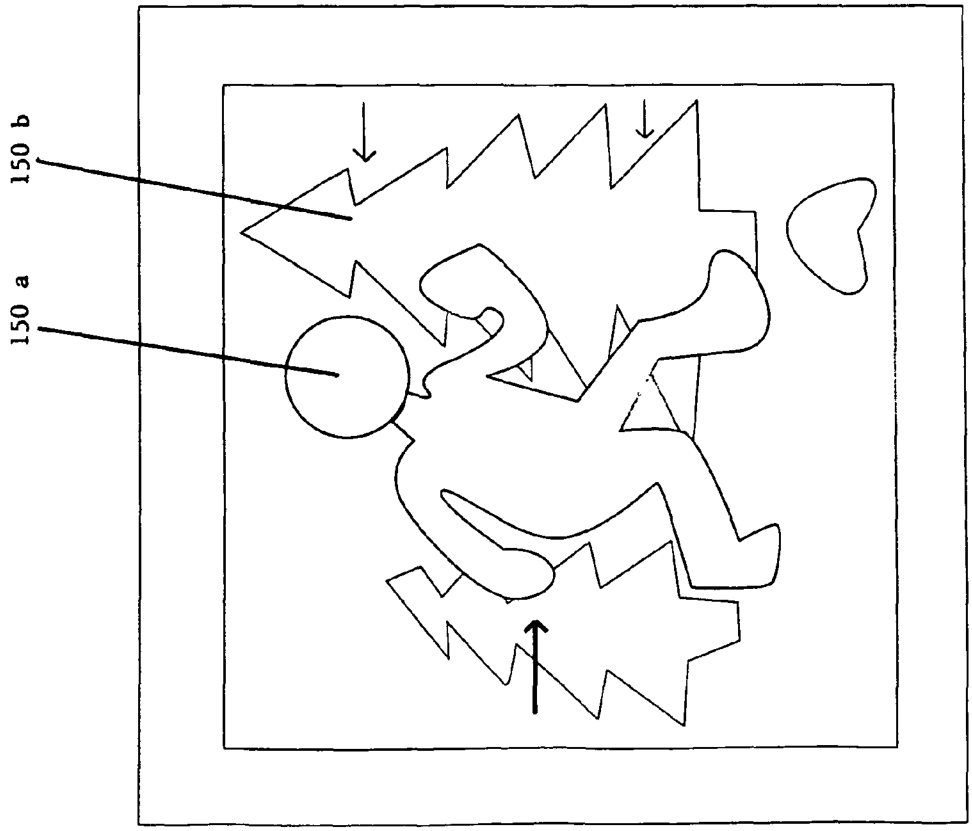
FIG. 12*a* illustrates a graphic of an advantageous symbol according to one embodiment of the present invention, the graphic having a foreground and a background.

In FIGS. 12a and 12b a graphical interaction is created to illustrate the animation of a foreground object relative to a background object. A foreground object 150a, which shows the contour of a person, is illustrated independently of a background object 150b, 150a shows scenery such as a tall tree and a small tree. An arrow illustrates that the foreground object 150a moves toward the right of the screen and two arrows illustrate that the background object 150b moves toward the left of the screen. Together, the foreground object 150a and the background object 150b simulate the motion of the person walking in a forest. In FIG. 12a, the tall tree of the background object 150b is displayed to the right, or in front, of the person. The graphic mode shown in FIG. 12a displays an initial position of the person relative to the forest, while the graphic mode shown in FIG. 12b displays a position of the person that is subsequent to the initial position of the person. In FIG. 12b, to simulate movement, the tall tree is now displayed to the left, or behind, the person.

In general, the animation, or graphical interaction, between graphic modes of an advantageous symbol that has landed along an active payline on one of the reels 60 can occur at any time during the wagering game. To build the player's anticipation level, the animation of the advantageous symbol may occur anytime before all the reels 60 have stopped spinning. Preferably, the animation occurs between the time when a first one of the reels 60 has stopped and the time when a second one of the reels 60 has stopped.

In the above-described embodiments any combination of two-dimensional and three-dimensional graphics can be implemented. For example, at least a portion of a graphic can be a two-dimensional or three-dimensional object that can be displayed to interact graphically with another portion of a graphic that is either a two-dimensional or a three-dimensional object.

Optionally, any of the above-described embodiments can include a glowing effect in the animation of one or more of the advantageous symbols. The glowing effect can be temporary or can last until a next game is played. Further, the glowing effect can increase proportionally with the number of advantageous symbols landing along any of the active paylines.

The above-described embodiments can be used with a video gaming terminal and/or with a mechanical gaming terminal. For example, the reels 60 can be video reels, mechanical reels, or a combination of video and mechanical reels. Thus, although the description refers to reels 60 being "moving" or being "stopped," this does not necessarily imply that the reels 60 are mechanical reels. From a player's perspective, if the reels 60 are video reels, the reels 60 can "move" or "stop" even though the reels 60 do not physically "move" or "stop."

While the invention is susceptible to various modifications and alternative forms, specific embodiments thereof have been shown by way of example in the drawings and herein described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

What is claimed is:

1. A gaming terminal for playing a wagering game, comprising:

a display for displaying at least one outcome of a plurality of outcomes in response to receiving a wager input from a player;

a plurality of reels being displayed in said display, said plurality of reels having an arrangement of symbols for indicating said at least one outcome to said player; and at least one advantageous symbol being located on a reel of said plurality of reels, said advantageous symbol being a symbol of said arrangement of symbols, said advantageous symbol having a number of graphic modes;

wherein, in response to said advantageous symbol on said reel landing along a payline before all of said plurality of reels have stopped, said display presents to said player an animation of said advantageous symbol on said reel based on at least two of said graphic modes of said advantageous symbol, said animation being presented before all of said plurality of reels have stopped spinning.

2. The gaming terminal of claim 1, wherein one of said graphic modes is a continuation of another one of said graphic modes.

3. The gaming terminal of claim 1, wherein one of said graphic modes is an expansion of another one of said graphic modes.

4. The gaming terminal of claim 1, wherein one of said graphic modes includes a border.

5. The gaming terminal of claim 4, wherein said border is illuminated.

6. The gaming terminal of claim 1, wherein each one of said graphic modes is overlapping over a basic graphic mode such that at least a portion of said basic graphic mode is visible to said player.

7. The gaming terminal of claim 1, wherein one of said graphic modes has a different size than another one of said graphic modes.

8. The gaming terminal of claim 1, wherein each of said graphic modes includes a foreground and a background, said foreground interacting graphically with said background.

9. The gaming terminal of claim 1, further comprising a controller coupled to said display, said controller being programmed to randomly-select said at least one outcome from said plurality of outcomes.

10. A method of conducting a wagering game on a gaming terminal, comprising:

accepting a wager input for a basic wagering game;

selecting at least one outcome for said basic wagering game in response to said wager input, said at least one outcome selected from a plurality of outcomes;

moving a plurality of reels having symbols that indicate said at least one outcome, at least one advantageous symbol being located on a reel of said plurality of reels, said advantageous symbol being a symbol of said symbols, said advantageous symbol having a number of graphic modes;

stopping a reel of said plurality of reels with an advantageous symbol landing along a payline before all of said plurality of reels have stopped;

creating a graphical animation of said advantageous symbol on said reel with at least two graphic modes of said advantageous symbol before all of said plurality of reels have stopped to increase a player's anticipation for a winning outcome; and stopping the remaining ones of said plurality of reels to indicate said at least one outcome after creating the graphical animation.

11. The method of claim 10, wherein said creating further includes displaying one of said graphic modes as a continuation of another one of said graphic modes.

12. The method of claim 10, wherein said creating includes displaying a border on at least one of said graphic modes.

13. The method of claim 12, wherein said creating further includes illuminating said border.

14. The method of claim 10, wherein said creating includes displaying one of said graphic modes as a different-sized copy of another one of said graphic modes.

15. The method of claim 10, wherein said creating includes displaying a foreground and a background for each of said graphic modes, said foreground interacting graphically with said background.

16. The method of claim 15, wherein said creating further includes moving said foreground with respect to said background.

17. The method of claim 10, further comprising awarding a bonus game when a predetermined number of advantageous symbols are aligned along said payline.

18. The method of claim 10, further comprising:

displaying a basic graphic mode in said advantageous symbol; and overlapping said basic graphic mode with at least one of said graphic modes such that at least a portion of said basic graphic mode is obscured from a player.

19. The method of claim 10, wherein said creating includes displaying at least one of said graphic modes as a three-dimensional animation.

20. The method of claim 10, wherein said creating includes displaying said graphical animation such that at least one of said graphic modes is perceived to expand beyond said advantageous symbol.

21. The method of claim 10, further comprising:

stopping another one of said plurality of reels with another advantageous symbol along said payline; and creating a second graphical animation between at least two graphic modes of said another advantageous symbol before all of said plurality of reels have stopped to increase a player's anticipation for a winning outcome.

22. The method of claim 21, further comprising stopping said graphical animation of said advantageous symbol before creating said second graphical animation of said another advantageous symbol.

23. The method of claim 21, further comprising stopping said graphical animation of said advantageous symbol after creating said second graphical animation of said another advantageous symbol.

24. The method of claim 10, wherein said selecting includes randomly-selecting said at least one outcome from said plurality of outcomes.

25. A method of conducting a wagering game on a gaming terminal, comprising:

accepting a wager input for a wagering game;

selecting at least one outcome for said wagering game in response to said wager input, said at least one outcome selected from a plurality of outcomes;

stopping a reel of a plurality of reels to align an advantageous symbol landing along a payline, said advantageous symbol including a first graphic mode and a second graphic mode, said advantageous symbol being located on said reel of said plurality of reels;

in response to said stopping, displaying an animation with said first graphic mode and said second graphic mode on said reel for visually indicating to a player how close said wagering game is to reaching a winning outcome, said animation helping to increase the anticipation in said player of said wagering game;

stopping the remaining ones of said plurality of reels after displaying said animation to indicate said at least one outcome; and providing an award according to a pay table if said at least one outcome is said winning outcome.

26. The method of claim 25, wherein said displaying includes showing said second graphic mode as a continuation of said first graphic mode.

27. The method of claim 25, wherein said displaying includes showing at least one of said first graphic mode and said second graphic mode having a border.

28. The method of claim 27, further comprising illuminating said border.

29. The method of claim 25, wherein said displaying includes showing said second graphic mode as a different-sized copy of said first graphic mode.

30. The method of claim 25, wherein said displaying includes showing a foreground and a background for each of said first graphic mode and said second graphic mode, said foreground interacting graphically with said background.

31. The method of claim 25, wherein said displaying includes showing said graphical animation as a three-dimensional animation.

32. The method of claim 25, wherein said selecting includes randomly-selecting said at least one outcome from said plurality of outcomes.

33. A method of conducting a wagering game, comprising:

randomly selecting at least one outcome from a plurality of outcomes in response to receiving a wager from a player;

presenting on a display to said player said at least one outcome in the form of an arrangement of symbols located on a plurality of reels, at least one of said symbols located on a reel of said plurality of reels being an advantageous symbol, said advantageous symbol having a number of graphic modes; and causing at least two graphic modes of said graphic modes to be displayed on said reel before all of said plurality of reels have stopped and all of said symbols in said arrangement are presented to said player.

34. The method of claim 33, wherein said causing includes displaying one of said graphic modes as a continuation of another one of said graphic modes.

35. The method of claim 33, wherein said causing includes displaying one of said graphic modes as an expansion of another one of said graphic modes.

36. The method of claim 33, wherein said causing includes displaying a border for at least one of said graphic modes.

37. The method of claim 36, wherein said displaying includes illuminating said border.

38. The method of claim 33, wherein said causing includes displaying one of said graphic modes as having a different size than another one of said graphic modes.

39. The method of claim 33, wherein said causing includes displaying a foreground and a background for at least one of said graphic modes, said foreground interacting graphically with said background.

40. The method of claim 39, wherein said displaying includes moving said foreground with respect to said background.

41. A gaming terminal for playing a wagering game, comprising:

a display;

at least one advantageous symbol being located on a reel of said plurality of reels, said advantageous symbol being a symbol of said arrangement of symbols, said advantageous symbol having a number of graphic modes; and a controller coupled to said display and programmed to in response to receiving a wager input from a player, present on said display at least one outcome of a plurality of outcomes in the form of an arrangement of symbols located on a plurality of reels, at least one of said symbols being an advantageous symbol located on a reel of said plurality of reels, and in response to said advantageous symbol on said reel landing along a payline before all of said plurality of reels have stopped spinning, cause at least two graphic modes of said at least one advantageous symbol on said reel to be displayed on said display before said arrangement is fully presented to said player upon stopping any remaining spinning reels.

42. The gaming terminal of claim 41, wherein said display is a video display.

43. The gaming terminal of claim 41, wherein said display is a mechanical display having at least one mechanical reel.

44. The gaming terminal of claim 41, wherein one of said graphic modes is a continuation of another one of said graphic modes.

45. The gaming terminal of claim 41, wherein one of said graphic modes is an expansion of another one of said graphic modes.

46. The gaming terminal of claim 41, wherein at least one of said graphic modes includes a border.

47. The gaming terminal of claim 46, wherein said border is illuminated.

48. The gaming terminal of claim 41, wherein at least one of said graphic modes is displayed above a basic graphic mode of said advantageous symbol such that at least a portion of said basic graphic mode is visible to a player.

49. The gaming terminal of claim 41, wherein one of said graphic modes has a different size than another one of said graphic modes.

50. The gaming terminal of claim 41, wherein at least one of said graphic modes includes a foreground and a background, said foreground interacting graphically with said background.

51. The gaming terminal of claim 50, wherein said foreground moves with respect to said background.

52. The gaming terminal of claim 41, wherein said at least two graphic modes include a first graphic mode and a second graphic mode, said first graphic mode being displayed on a first reel of a plurality of reels, said first graphic mode being replaced with said second graphic mode, said second graphic mode being displayed on said first reel when a second reel of said plurality of reels has stopped.

53. The gaming terminal of claim 52, wherein said first reel is adjacent to said second reel.

54. The gaming terminal of claim 41, wherein one of said graphic modes is an animation of another one of said graphic modes.

55. The gaming terminal of claim 41, wherein said controller is further programmed to randomly select said at least one outcome.

56. A method of conducting a video wagering game, comprising:

rotating a plurality of symbol-bearing reels, at least one advantageous symbol being located on a symbol-bearing reel of said plurality of symbol-bearing reels;

stopping said symbol-bearing reels with said at least one advantageous symbol landing along a payline;

displaying said advantageous symbol on said symbol-bearing reel to a player before all of said plurality of symbol-bearing reels have stopped; and animating said advantageous symbol on said symbol-bearing reel before all of said symbol-bearing reels have stopped.

57. The method of claim 56, further comprising triggering a winning outcome in response to said advantageous symbol having been displayed to said player.

58. The method of claim 57, further comprising selecting said winning outcome from a group consisting of a bonus-award outcome, a credit-award outcome, a progressive-award outcome, and a top-award outcome.

59. The method of claim 56, wherein said animating includes displaying a first graphic mode of said advantageous symbol as a continuation of another graphic mode of said advantageous symbol.

60. The method of claim 56, wherein said animating includes displaying a first graphic mode of said advantageous symbol as an expansion of a second graphic mode of said advantageous symbol.

61. The method of claim 56, wherein said animating includes displaying a border for a graphic mode of said advantageous symbol.

62. The method of claim 61, wherein said displaying includes illuminating said border.

63. The method of claim 56, wherein said animating includes displaying a first graphic mode of said advantageous symbol as having a different size than a second graphic mode of said advantageous symbol.

64. The method of claim 56, wherein said animating includes displaying a foreground and a background for a graphic mode of said advantageous symbol, said foreground interacting graphically with said background.

65. The method of claim 64, wherein said displaying includes moving said foreground with respect to said background.

66. The method of claim 56, wherein said animating further includes showing a three-dimensional animation.

67. The method of claim 56, wherein said animating includes changing the pace of said animating of said advantageous symbol to heighten a player's anticipation.

68. The method of claim 67, wherein said changing said pace of said animating includes increasing said pace.

69. The method of claim 68, wherein said changing of said pace increases as additional advantageous symbols are displayed on said display.

70. The method of claim 56, wherein said animating includes a glowing effect.

71. A method of conducting a video wagering game, comprising:

accepting a wager input for a wagering game;

selecting at least one outcome for said wagering game in response to said wager input, said at least one outcome being selected from a plurality of outcomes;

displaying on a display a portion of a symbol array, said symbol array being located on a plurality of reels, said symbol array including an advantageous symbol being located on a reel of said plurality of reels; and in response to said advantageous symbol on said reel landing along a payline before all of said plurality of reels have stopped, animating said advantageous symbol before displaying a remaining portion of said symbol array upon stopping any remaining spinning reels.

72. The method of claim 71, further comprising triggering a winning outcome in response to said advantageous symbol having been displayed to a player.

73. The method of claim 72, further comprising selecting said winning outcome from a group consisting of a bonus-award outcome, a credit-award outcome, a progressive-award outcome, and a top-award outcome.

74. The method of claim 71, wherein said animating includes displaying a first graphic mode of said advantageous symbol as a continuation of another graphic mode of said advantageous symbol.

75. The method of claim 71, wherein said animating includes displaying a first graphic mode of said advantageous symbol as an expansion of a second graphic mode of said advantageous symbol.

76. The method of claim 71, wherein said animating includes displaying a border for a graphic mode of said advantageous symbol.

77. The method of claim 76, wherein said displaying includes illuminating said border.

78. The method of claim 71, wherein said animating includes displaying a first graphic mode of said advantageous symbol as having a different size than a second graphic mode of said advantageous symbol.

79. The method of claim 71, wherein said animating includes displaying a foreground and a background for a graphic mode of said advantageous symbol, said foreground interacting graphically with said background.

80. The method of claim 79, wherein said displaying includes moving said foreground with respect to said background.

81. The method of claim 71, wherein said animating further includes showing a three-dimensional animation.

82. The method of claim 71, wherein said animating includes changing the pace of said animating of said advantageous symbol to heighten a player's anticipation.

83. The method of claim 82, wherein said changing said pace of said animating includes increasing said pace.

84. The method of claim 83, wherein said changing of said pace increases as additional advantageous symbols are displayed on said display.

85. The method of claim 71, wherein said animating includes a glowing effect.

* * * * *